US011074566B2

(12) United States Patent
Lee et al.

(10) Patent No.: US 11,074,566 B2
(45) Date of Patent: Jul. 27, 2021

(54) POINT OF SALE TERMINAL

(71) Applicant: NCR Corporation, Duluth, GA (US)

(72) Inventors: Kwan Woo Lee, Johns Creek, GA (US); Michael Vincent Kane, Norcross, GA (US)

(73) Assignee: NCR Corporation, Atlanta, GA (US)

( * ) Notice: Subject to any disclaimer, the term of this patent is extended or adjusted under 35 U.S.C. 154(b) by 409 days.

(21) Appl. No.: 15/689,444

(22) Filed: Aug. 29, 2017

(65) Prior Publication Data
US 2019/0066076 A1 Feb. 28, 2019

(51) Int. Cl.
G06Q 20/20 (2012.01)
G06F 1/16 (2006.01)
G07G 1/00 (2006.01)
G06Q 20/32 (2012.01)
G07G 1/12 (2006.01)

(52) U.S. Cl.
CPC ......... *G06Q 20/204* (2013.01); *G06F 1/1632* (2013.01); *G06Q 20/32* (2013.01); *G07G 1/0009* (2013.01); *G07G 1/0018* (2013.01); *G07G 1/12* (2013.01)

(58) Field of Classification Search
CPC ...... G06Q 20/204; G06Q 20/32; G06Q 20/20; G06F 1/1632; G07G 1/0009; G07G 1/0018
See application file for complete search history.

(56) References Cited

U.S. PATENT DOCUMENTS

| D458,255 | S | * | 6/2002 | Hsu | D14/373 |
| 9,033,228 | B2 | * | 5/2015 | Govindarajan | G06Q 90/00 235/383 |
| 9,558,482 | B2 | * | 1/2017 | Hicks | G07G 1/0081 |
| D810,816 | S | * | 2/2018 | Chen | D18/4.4 |
| D831,106 | S | * | 10/2018 | Saeed | D18/4.5 |
| 2014/0058859 | A1 | * | 2/2014 | Alexander | G06Q 20/20 705/17 |
| 2015/0185768 | A1 | * | 7/2015 | Voege | G06Q 30/0281 361/679.3 |
| 2017/0140615 | A1 | * | 5/2017 | Larnac | G07G 1/0018 |
| 2017/0372286 | A1 | * | 12/2017 | Hiroi | G06Q 20/20 |
| 2019/0004572 | A1 | * | 1/2019 | Luo | G07G 1/12 |

OTHER PUBLICATIONS

European Search Report—dated Oct. 5, 2018.

* cited by examiner

*Primary Examiner* — Florian M Zeender
*Assistant Examiner* — Whitney Poffenbarger
(74) *Attorney, Agent, or Firm* — Schwegman, Lundberg & Woessner

(57) ABSTRACT

Disclosed herein is a point of sale terminal. The point of sale terminal may include a housing, a customer display, and a payment device. The housing may define a customer display opening and a tablet opening. The customer display may be located within the housing and arranged to be visible through the customer display opening. The payment device may be located within the housing proximate customer display opening.

17 Claims, 3 Drawing Sheets

POINT OF SALE TERMINAL

BACKGROUND

Point of sale terminals allow customers to pay for merchandise or services. They also are large and not portable. For example, point of sale terminals at department stores sit on countertops and can weight over 50 pounds. The large size and overall complexity of typical point of sale terminals also cause them to be very expensive.

SUMMARY

Disclosed herein is a point of sale terminal. The point of sale terminal may include a housing, a customer display, and a payment device. The housing may define a customer display opening and a tablet opening. The customer display may be located within the housing and arranged to be visible through the customer display opening. The payment device may be located within the housing proximate customer display opening.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
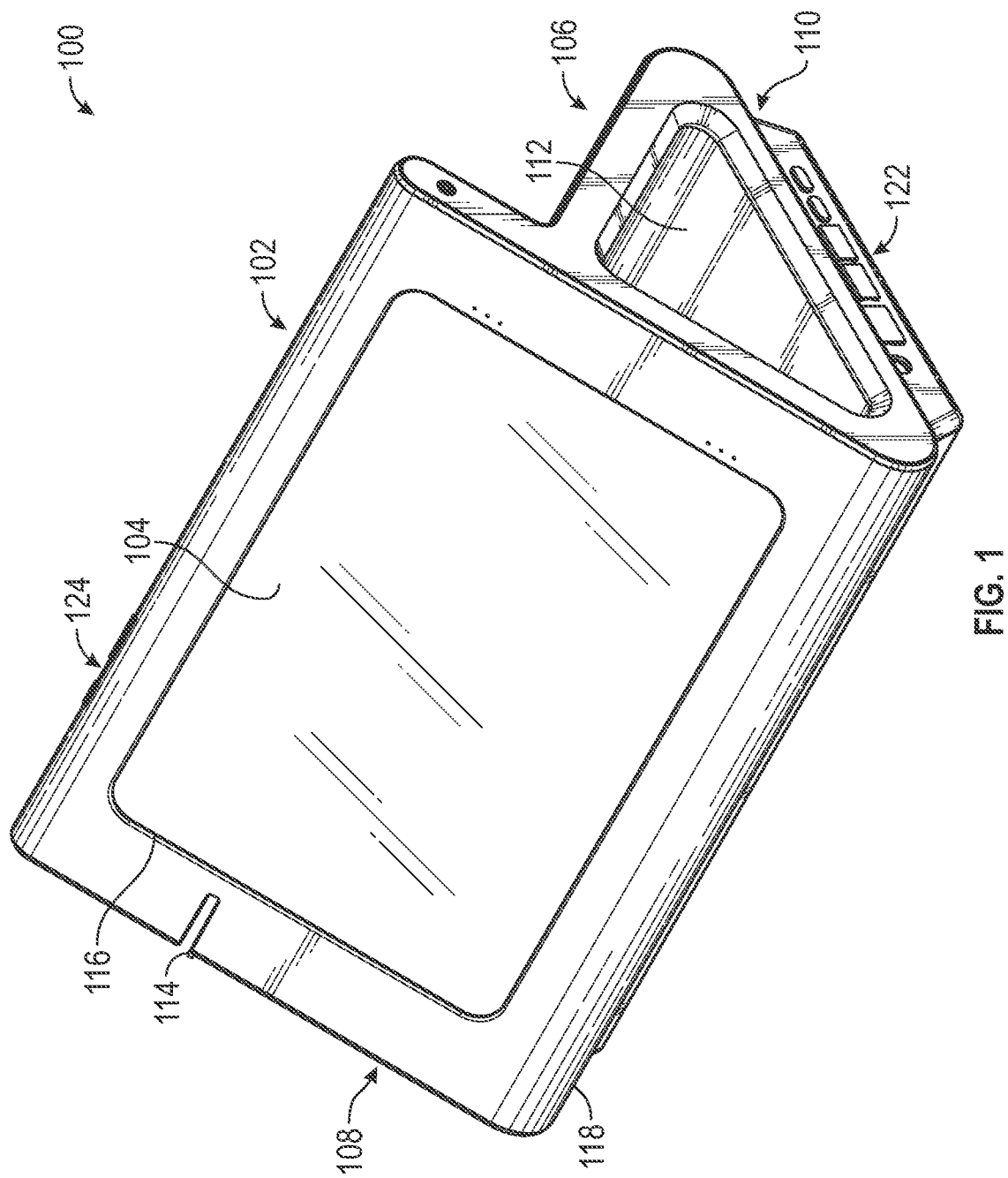
FIG. 1 shows a point of sale terminal consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit the disclosure. Instead, the proper scope of any invention disclosed herein is defined by the appended claims.

With typical point of sale terminals being big, heavy, and expensive, there is a need for a small, lightweight, portable, and low cost point of sale terminal. Disclosed herein is a point of sale terminal that is lightweight, small, portable, and low cost. The point of sale terminal disclosed herein utilizes common off the shelf electronics that allow for rapid production. In addition, the point of sale terminal disclosed herein can be transported between locations due to its small size and light weight.

Figure 2:
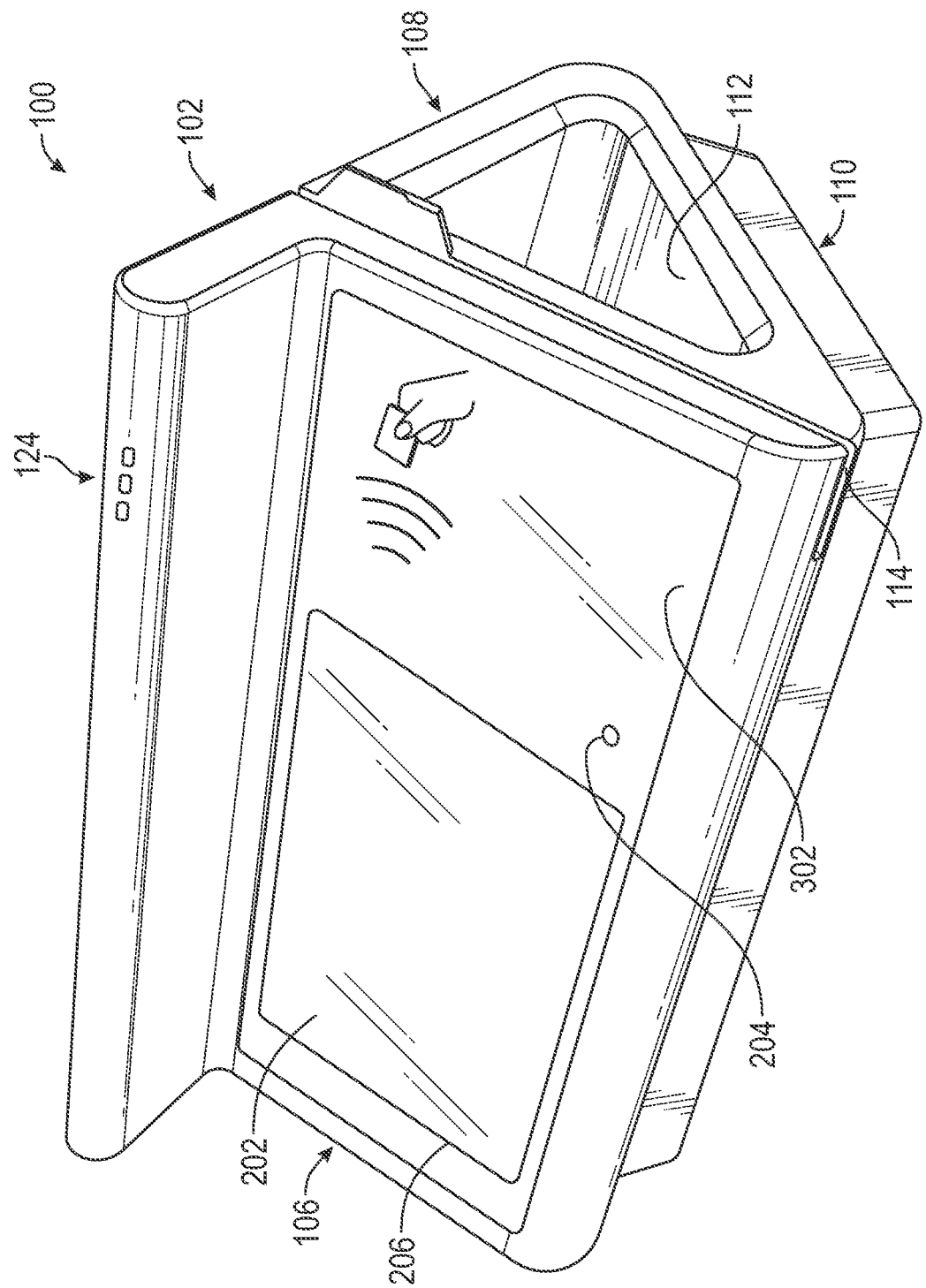
FIG. 2 shows a point of sale terminal consistent with this disclosure.
Figure 3:
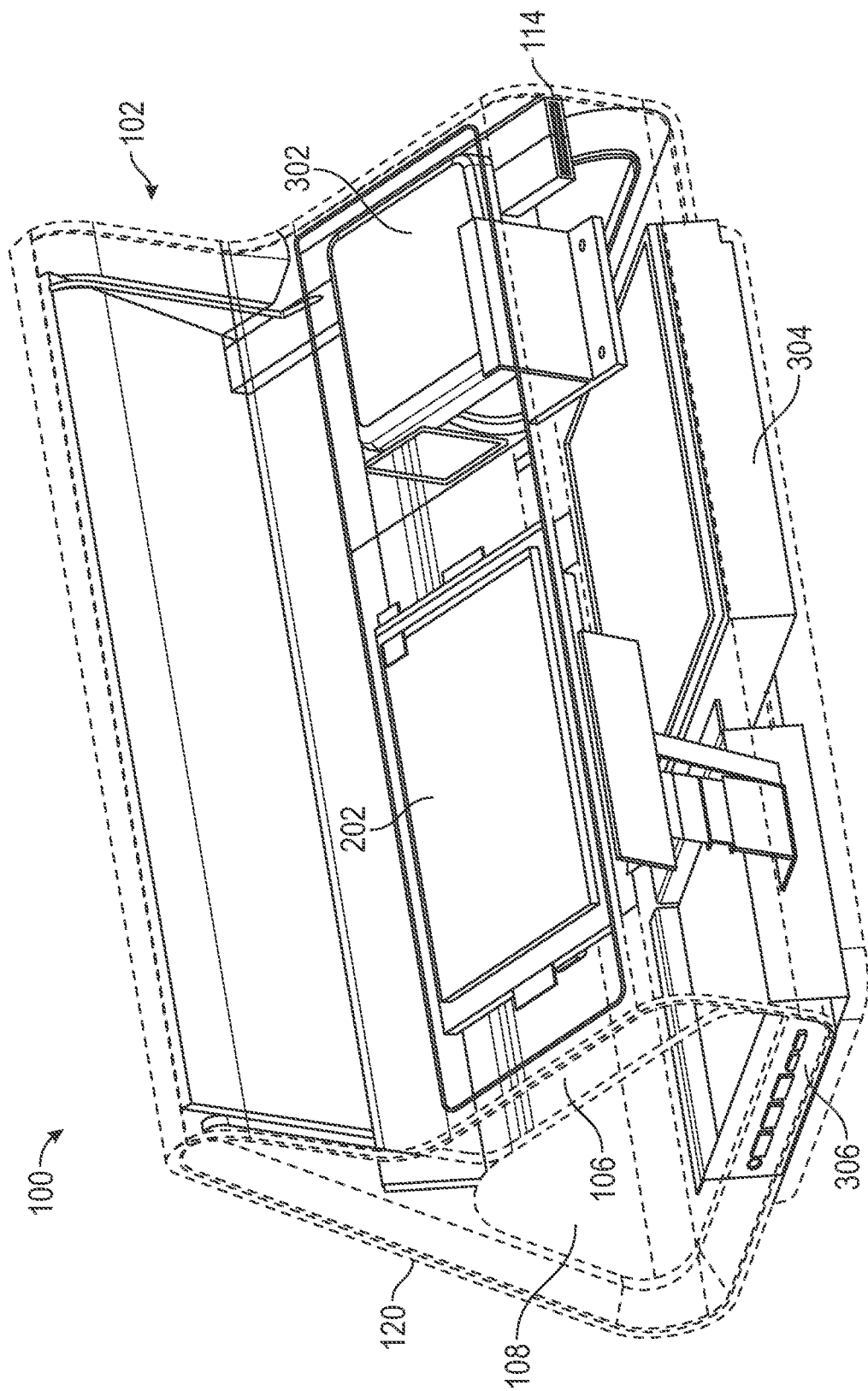
FIG. 3 shows a point of sale terminal consistent with this disclosure.

Turning now to the figures, FIGS. 1-3 show a point of sale terminal 100 consistent with embodiments disclosed herein. The point of sale terminal 100 may include a housing 102, a tablet 104, a customer display 202, a camera 204, a payment device 302, a battery pack 304, and a communications module 306. The housing 102 may include a first inclined portion 106, a second inclined portion 108, and a base portion 110. As shown, the first inclined portion 106 and the second inclined portion 108 are formed at an angle relative to the base portion 110. The angle of each of the first inclined portion 106 and the second inclined portion 108 relative to the base portion 110 may be the same or different. For example, the first inclined portion 106 may be oriented at a first angle (e.g., 30°) and the second inclined portion 108 may be oriented at a second angle (e.g., 45°) relative to the base portion. The first inclined portion 106 may also intersect the second inclined portion 108 at a right angle. The first inclined portion 106, the second inclined portion 108, and the base portion 110 may form a through passage 112. The through passage 112 may allow air to circulate behind the tablet 104 and the customer display 202 to provide convective cooling of the table 104, the customer display 202, and other components of the point of sale terminal 100. The convective cooling of the table 104 may be via natural convection (i.e., without a fan). As a result, operation of the point of sale terminal 100 without a fan may provide for quieter operations and result in less energy usuage.

The first inclined portion 106 may define a credit card slot 114. The credit card slot 114 may pass through the second inclined portion 108 as shown in FIG. 1. The credit card slot may include a magnetic credit card reader that is in electrical communication with the table 104 or the payment device 302.

The second inclined portion 108 may define a tablet opening 116. The tablet opening 116 may secure the tablet 104 within the second inclined portion 108. The second inclined portion 108 may include internal supports that hold the tablet 104. The internal supports may be tablet specific or may be generic. For example, the internal supports may be specific to a Galaxy Tab, an iPad, etc. or the supports may be for a 10 inch table, a 7.5 inch table, etc.

The housing 102 may include a hinge 118 that allows a faceplate 120 of the second inclined portion 108 to be tilted away from the housing 102 to allow installation or removal of the table 104. For example, a consumer may purchase the point of sale terminal 100 without the tablet 104. Upon purchasing the point of sale terminal 100, the consumer may install his or her own tablet by tilting the faceplate 120 away from the housing 102 via the hinge 118 to expose the internal supports. By allowing the consumer to install his or her own tablet, the capital costs to the consumer and the manufacturing costs of the point of sale terminal 100 may be lowered.

The tablet 104 may be any off the shelf tablet such as an iPad, Galaxy Note, Galaxy Tab A 10.1, etc. The tablet 104 may include software that allows the tablet 104 to control the other components of the point of sale terminal 100. For example, the tablet 104 may include software that allows transaction information to be displayed on the customer display 202. In addition, the tablet 104 may include software that allows the tablet 104 to receive information from the payment device 302 and the camera 204.

The tablet 104 may also include a wireless card that allows the point of sale terminal 100 to communicate with other devices and systems via the Internet. For instance, the tablet 104 may receive payment information via the payment device 302 and transmit the payment information to a processor via the Internet or other network.

The tablet 104 may also include a touchscreen that allows cashiers or other merchant personnel to operate the point of sale terminal 100. For example, the tablet 104 may include merchant software that allows the cashier to initiate and complete a transaction. In addition, using the tablet 104, a cashier may monitor inventory or other day to day operations of an establishment. For example, using the tablet 104, a merchant may monitor an inventory level via POS software installed on the tablet 104 and order additional inventory when current on-hand supply gets below a preset level.

The base portion 110 may define one or more openings 122. The openings 122 can allow for the addition of peripheral devices. For example, the communications module 306 may allow for USB connections, an Ethernet connection, FireWire connections, Lightening connections, etc. One of the openings 122 may also allow for an external power supply (not shown) to be connected to the point of sale terminal 100. The external power supply may power the point of sale terminal 100 during operations or be used to recharge the batter 304 when the point of sale terminal 100 is not in use. In addition, communications module 306 may allow the point of sale terminal 100 to connect with a printer via a hardwire connection so that receipts, coupons, or other items can be printed for the customer.

The housing 100 may also define one or more buttons 124. The buttons may allow a user to actuate buttons on the tablet 104. For example, the buttons 124 may allow the user to turn the tablet 104 on or off. In addition, the buttons 124 may allow the user to raise or lower the volume of the tablet 104.

As shown in FIG. 2, the first inclined portion 106 may define a customer display opening 206. The customer display opening 206 may allow the customer display 202 to be secured inside the housing 102 while still visible to the customer. In addition, a portion of the second inclined portion 108 may extend beyond the first inclined portion 106 to shield the customer display 202 from a cashier. Shielding the customer display 202 from the cashier may allow the customer to enter personal identification numbers (PIN) or other information without the cashier seeing it.

Located adjacent to the customer display 202 may be the payment device 302. The payment device 302 may cooperate with the credit card slot 114 to allow a customer to pay via credit card. In addition, the credit card slot 114 may communicate with the tablet 104 so that credit card information may pass from the credit card slot 114 directly to the tablet 104 for processing. Furthermore, the payment device 302 may allow customers to pay via wireless technologies. For example, the payment device 302 may allow for near field communications between the payment device 302 and a smartphone or smartwatch. Thus, the customer may be able to pay for goods and services without having to produce a credit card. The use of wireless payment methods such as ApplePay and Google Wallet, may reduce credit card fraud.

The camera 204 may also be locate such that its lens is visible via the first inclined portion 106. The camera 204 can be in electrical communication with the tablet 104 and the customer display 202. The camera 204 may act as a scanner. For example, the camera 204 may allow the customer to scan paper coupons or barcodes on a mobile device that act as coupons. The camera 204 may also allow an image of the customer to be captured at the time of the transaction. Capturing an image of the customer may help in combating fraud and identifying people that may use a stolen credit card.

The customer display 202 may allow the customer to view details of a transaction as well as provide a system for the customer to enter information. For example, the customer display 202 may be a touchscreen and allow the customer to enter a PIN or other security information. In addition, the customer display 202 may allow the customer's signature to be captured, the customer to enter a tip, or email address to which a receipt may be emailed, etc. Furthermore, as the transaction is being completely, the customer display 202 may display the price of items that are rung up as well as any discounts the customer may be receiving.

The customer display 2020 may also allow advertisements to be displayed. For example, coupons the customer may redeem at a later date may be displayed and the customer may enter an email address or loyalty program member number to claim the coupon. In addition, the advertisement may be in the form of a video commercial that may promote specials.

The housing 102 may be constructed of a polymer or other lightweight, yet durable material. In addition, the housing 102 may be manufactured via techniques such as, but not limited to, injection molding, rotomolding, etc. The housing 102 may be manufactured as a single component or may be manufactured as multiple components that may be assembled. For example, the faceplate 120 and the base portion 110 may be injection molded separately from the rest of the housing 102. As such, the components of the point of sale terminal 100 (i.e., the camera, 204, payment deice 302, communications module 306, customer display 202, etc. may be installed within the housing 102 and then the base portion 110 and the faceplate 120 attached to the housing 102.

The various components of the point of sale terminal 100 may be held in place within the housing 102 via structures created within the housing 102. For example, clips may be molded into the housing 102, base portion 110, or faceplate 120 to hold the various components.

EXAMPLES

Example 1 is a point of sale terminal comprising: a housing defining a customer display opening and a tablet opening; a customer display located within the housing and arranged to be visible through the customer display opening; and a payment device located within the housing proximate customer display opening.

In Example 2, the subject matter of Example 1 optionally includes a tablet located within the housing and arranged to be visible through the customer display, the tablet in electrical communication with the payment device and the customer display.

In Example 3, the subject matter of Example 2 optionally includes wherein the tablet is an off the shelf tablet.

In Example 4, the subject matter of any one or more of Examples 1-3 optionally include wherein the payment device includes a credit card reader.

In Example 5, the subject matter of any one or more of Examples 1-4 optionally include wherein the payment device includes a near field communication module operable to communicate with a smartphone or smartwatch.

In Example 6, the subject matter of any one or more of Examples 1-5 optionally include a camera configured to communicate with a tablet, the camera located proximate the customer display opening.

In Example 7, the subject matter of any one or more of Examples 1-6 optionally include a battery pack configured to power the point of sale terminal.

In Example 8, the subject matter of any one or more of Examples 1-7 optionally include a communications port configured to communicate with a tablet.

Example 9 is a point of sale terminal comprising: a housing having a first inclined portion and a second inclined portion, the first inclined portion defining a customer display opening, the second inclined portion defining a tablet opening; a customer display located within the housing and arranged to be visible through the customer display opening; a payment device located within the housing and proximate the customer display opening; and a tablet located within the housing and arranged to be visible through the tablet opening, the table in electrical communication with the customer display and the payment device.

In Example 10, the subject matter of Example 9 optionally includes wherein the tablet is an off the shelf tablet.

In Example 11, the subject matter of any one or more of Examples 9-10 optionally include wherein the housing defines a credit card slot and the payment device includes a credit card reader arrange to read a credit card passing through the credit card slot.

In Example 12, the subject matter of any one or more of Examples 9-11 optionally include wherein the payment device includes a near field communication module operable to communicate with a smartphone or smartwatch.

In Example 13, the subject matter of any one or more of Examples 9-12 optionally include a camera located proximate the customer display opening and in electrical communication with the tablet.

In Example 14, the subject matter of any one or more of Examples 9-13 optionally include a batter pack configured to power the payment device, customer display, and the tablet.

In Example 15, the subject matter of any one or more of Examples 9-14 optionally include a communications port in electrical communications with the tablet.

Example 16 is a point of sale terminal comprising: a housing having a first inclined portion and a second inclined portion, the first inclined portion defining a customer display opening, the second inclined portion defining a tablet opening, the first inclined portion intersecting the second inclined portion; a customer display located within the housing and arranged to be visible through the customer display opening; a payment device located within the housing and proximate the customer display opening; a camera located proximate the customer display opening; a tablet located within the housing and arranged to be visible through the tablet opening, the table in electrical communication with the customer display and the payment device; and a batter pack configured to power the payment device, customer display, the camera, and the tablet.

In Example 17, the subject matter of Example 16 optionally includes wherein the tablet is an off the shelf tablet.

In Example 18, the subject matter of any one or more of Examples 16-17 optionally include wherein the housing defines a credit card slot and the payment device includes a credit card reader arrange to read a credit card passing through the credit card slot.

In Example 19, the subject matter of any one or more of Examples 16-18 optionally include wherein the payment device includes a near field communication module operable to communicate with a smartphone or smartwatch.

In Example 20, the subject matter of any one or more of Examples 16-19 optionally include wherein the first inclined portion intersects the second inclined portion at a right angle.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A point of sale terminal comprising:
   a housing having a first inclined portion, a second inclined portion, and a base portion, wherein:
      the first inclined portion is immovably connected to the second inclined portion in between a first end and a second end of the second inclined portion so that a portion of the second inclined portion extends beyond the first inclined portion,
      a first end of the first inclined portion immovably connected to the base portion and the first end of the second inclined portion immovably connected to the base portion so as to define a through passage, and
      the first inclined portion defining a customer display opening and the second inclined portion defining a tablet opening;
   a plurality of buttons located along the second end of the second inclined portion;
   a credit card slot defined by an edge of the first inclined portion, wherein the credit card slot extending the entire length of the edge of the first inclined portion and passing through a portion of an edge of the second inclined portion;
   a projection extending from the edged of the first inclined portion and located beneath the credit card slot;
   a customer display located within and at a first end of the housing and arranged to be visible through the customer display opening; and
   a payment device located within and at a second end of the housing proximate customer display opening.

2. The point of sale terminal of claim 1, further comprising a tablet located within the housing and arranged to be visible through the tablet opening, the tablet in electrical communication with the payment device and the customer display.

3. The point of sale terminal of claim 2, wherein the tablet is an off the shelf tablet.

4. The point of sale terminal of claim 1, wherein the payment device includes a near field communication module operable to communicate with a smartphone or smartwatch.

5. The point of sale terminal of claim 1, further comprising a camera configured to communicate with a tablet, the camera located proximate the customer display opening.

6. The point of sale terminal of claim 1, further comprising a battery pack configured to power the point of sale terminal.

7. The point of sale terminal of claim 1, further comprising a communications port configured to communicate with a tablet.

8. A point of sale terminal comprising:
   a housing having a base portion, a first inclined portion, and a second inclined portion, wherein:
      the first inclined portion is immovably connected to the second inclined portion at a right angle so that a portion of the second inclined portion extends beyond the first inclined portion,
      a first end of the first inclined portion immovably connected to the base portion and the first end of the second inclined portion immovably connected to the base portion so as to define a through passage, and the first inclined portion defining a customer display opening, the second inclined portion defining a tablet opening;
a plurality of buttons located along the second end of the second inclined portion;
a credit card slot defined by an edge of the first inclined portion, wherein the credit card slot extending the entire length of the edge of the first inclined portion and passing through a portion of an edge of the second inclined portion;
a projection extending from the edged of the first inclined portion and located beneath the credit card slot;
a customer display located within and at a first end of the housing and arranged to be visible through the customer display opening;
a payment device located within and at a second end of the housing and proximate the customer display opening; and
a tablet located within the housing and arranged to be visible through the tablet opening, the tablet in electrical communication with the customer display and the payment device.

9. The point of sale terminal of claim 8, wherein the tablet is an off the shelf tablet.

10. The point of sale terminal of claim 8, wherein the payment device includes a near field communication module operable to communicate with a smartphone or smartwatch.

11. The point of sale terminal of claim 8, further comprising a camera located proximate the customer display opening and in electrical communication with the tablet.

12. The point of sale terminal of claim 8, further comprising a battery pack configured to power the payment device, customer display, and the tablet.

13. The point of sale terminal of claim 8, further comprising a communications port in electrical communications with the tablet.

14. A point of sale terminal comprising:
a housing including:
a base portion including a first end and a second end,
a first inclined portion including a first end and a second end, the first inclined portion defining a customer display opening, the first end of the first inclined portion immovably connected to the first end of the base portion, and
a second inclined portion including a first end, a second end, and a middle portion located in between the first and second ends of the second inclined portion, wherein:
the second inclined portion defining a tablet opening,
the second end of the first inclined portion is immovably connected to the middle portion of the second inclined portion at a right angle,
the first end of the second inclined portion immovably connected to the second end of the base portion, and
the first inclined portion, the second inclined portion, and the base portion defining a through passage;
a plurality of buttons located along the second end of the first inclined portion;
a credit card slot defined by an edge of the second inclined portion that extends the entire length of the first inclined portion and passes through a portion of an edge of the second inclined portion;
a projection extending from the edged of the first inclined portion and located beneath the credit card slot a customer display located within and at a first end of the housing and arranged to be visible through the customer display opening;
a payment device located within and at a second end of the housing and proximate the customer display opening;
a camera located proximate the customer display opening;
a tablet located within the housing and arranged to be visible through the tablet opening, the tablet in electrical communication with the customer display and the payment device; and
a battery pack configured to power the payment device, customer display, the camera, and the tablet.

15. The point of sale terminal of claim 14, wherein the tablet is an off the shelf tablet.

16. The point of sale terminal of claim 14, wherein the payment device includes a near field communication module operable to communicate with a smartphone or smartwatch.

17. The point of sale terminal of claim 14, wherein the first inclined portion intersects the second inclined portion at a right angle.

* * * * *